(12) United States Patent
Bae et al.

(10) Patent No.: US 10,777,868 B2
(45) Date of Patent: Sep. 15, 2020

(54) WAVEGUIDE COMPRISING FIRST AND SECOND DIELECTRIC PARTS, WHERE THE FIRST DIELECTRIC PART COMPRISES TWO OR MORE SEPARATE DIELECTRIC PARTS

(71) Applicant: KOREA ADVANCED INSTITUTE OF SCIENCE AND TECHNOLOGY, Daejeon (KR)

(72) Inventors: Hyeon Min Bae, Daejeon (KR); Ha Il Song, Daejeon (KR); Joon Yeong Lee, Daejeon (KR); Tae Hoon Yoon, Daejeon (KR); Hyo Sup Won, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 26 days.

(21) Appl. No.: 16/145,530

(22) Filed: Sep. 28, 2018

(65) Prior Publication Data

US 2019/0067775 A1 Feb. 28, 2019

Related U.S. Application Data

(63) Continuation of application No. PCT/KR2017/003336, filed on Mar. 28, 2017.

(30) Foreign Application Priority Data

Mar. 28, 2016 (KR) .................. 10-2016-0037121
Mar. 28, 2016 (KR) .................. 10-2016-0037141
Aug. 17, 2016 (KR) .................. 10-2016-0104466

(51) Int. Cl.
*H01P 3/16* (2006.01)
*H01P 3/10* (2006.01)
(Continued)

(52) U.S. Cl.
CPC ................ *H01P 3/16* (2013.01); *H01P 3/081* (2013.01); *H01P 3/10* (2013.01); *H01P 3/12* (2013.01);
(Continued)

(58) Field of Classification Search
CPC .................................. H01P 3/16; H01P 3/122
(Continued)

(56) References Cited

U.S. PATENT DOCUMENTS 3,703,690 A 11/1972 Ravenscroft et al.
4,216,449 A 8/1980 Kach
(Continued)

FOREIGN PATENT DOCUMENTS

CA 2449596 A1 6/2005
CN 1365160 A 8/2002
(Continued)

OTHER PUBLICATIONS

International Search Report dated Jul. 18, 2017.
(Continued)

*Primary Examiner* — Benny T Lee
(74) *Attorney, Agent, or Firm* — Dinsmore & Shohl LLP; Yongsok Choi, Esq.

(57) ABSTRACT

The present invention relates to a waveguide for transmission of electromagnetic wave signals. According to one aspect of the invention, there is provided a waveguide for transmission of electromagnetic wave signals, comprising: a dielectric part comprising two or more dielectrics having different permittivity; and a conductor part surrounding at least a part of the dielectric part.

6 Claims, 9 Drawing Sheets

(51) Int. Cl.
*H01P 5/08* (2006.01)
*H01P 3/12* (2006.01)
*H01P 5/02* (2006.01)
*H01P 3/08* (2006.01)
*H01Q 9/04* (2006.01)
*H01Q 13/06* (2006.01)
*H04L 12/40* (2006.01)

(52) U.S. Cl.
CPC ............ *H01P 3/122* (2013.01); *H01P 3/165* (2013.01); *H01P 5/02* (2013.01); *H01P 5/08* (2013.01); *H01P 5/087* (2013.01); *H01Q 9/045* (2013.01); *H01Q 9/0407* (2013.01); *H01Q 13/06* (2013.01); *H04L 12/40052* (2013.01)

(58) Field of Classification Search
USPC ........................................................ 333/239
See application file for complete search history.

(56) References Cited

U.S. PATENT DOCUMENTS

| | | | |
|---|---|---|---|
| 4,441,091 A | 4/1984 | Nishida et al. | |
| 5,488,380 A | 1/1996 | Harvey et al. | |
| 6,417,742 B1 | 7/2002 | Enokuma | |
| 2002/0027481 A1* | 3/2002 | Fiedziuszko | H01P 1/203 333/116 |
| 2003/0122634 A1 | 7/2003 | Goff | |
| 2003/0227360 A1 | 12/2003 | Kirihara et al. | |
| 2013/0256849 A1 | 10/2013 | Elad et al. | |
| 2014/0368301 A1 | 12/2014 | Herbsommer et al. | |
| 2015/0295297 A1* | 10/2015 | Cook et al. | H01P 3/122 333/239 |
| 2015/0295299 A1 | 10/2015 | Herbsommer | |
| 2017/0170539 A1* | 6/2017 | Morgan et al. | H01P 3/16 |

FOREIGN PATENT DOCUMENTS

| | | |
|---|---|---|
| CN | 102956946 A | 3/2013 |
| CN | 103091769 A | 5/2013 |
| FR | 1190178 A | 10/1959 |
| JP | S5527717 A | 2/1980 |
| JP | 2002543449 A | 12/2002 |
| JP | 2003069312 A | 3/2003 |
| JP | 2004015483 A | 1/2004 |
| JP | 2005515677 A | 5/2005 |
| JP | 2007235630 A | 9/2007 |
| JP | 2008028523 A | 2/2008 |
| JP | 4724849 B2 | 7/2011 |
| JP | 2015080100 A | 4/2015 |
| JP | 2018537044 A | 12/2018 |
| KR | 1020010112034 A | 12/2001 |
| KR | 100846872 B1 | 7/2008 |
| WO | 2017102157 A1 | 6/2017 |

OTHER PUBLICATIONS

Andrey Mozharovskiy, et al., "Wideband Tapered Antipodal Fin-Line Waveguide-to-Microstrip Transition for E-band Applications," 2013 European Microwave Conference, Nuremberg, Oct. 2013, pp. 1187-1190.

Sung Jing, et al., "Waveguide-to-Microstrip Antipodal Finline Transition at W Band," 2013 Third International Conference on Instrumentation, Measurement, Computer, Communication and Control, Shenyang, Sep. 2013, pp. 510-513.

Shaghik Atakaramians, et al., "Terahertz dielectric waveguides", Advances in Optics and Photonics, 2013 Optical Society of America, Jun. 27, 2013, vol. 5, No. 2, pp. 169-215.

Soon Hee Kim, et al., "A Study on the Propagation Characteristics of Circular Waveguide with N-Layer Dielectric", Korean Institute of Communications Science & Engineering, Kwangwoon University, 1986 Spring Conference, May 24, 1986.

George E. Ponchak, et al., "A New Model for Broadband Waveguide to Microstrip Transition Design", NASA Technical Memorandum, Lewis Research Center, Cleveland Ohio, Dec. 1986.

* cited by examiner

PRIOR ART

WAVEGUIDE COMPRISING FIRST AND SECOND DIELECTRIC PARTS, WHERE THE FIRST DIELECTRIC PART COMPRISES TWO OR MORE SEPARATE DIELECTRIC PARTS

CROSS-REFERENCE TO RELATED APPLICATIONS

This application is a continuation application of PCT/KR2017/003336 filed on Mar. 28, 2017 which claims priority to Korean Patent Application No. 10-2016-0037121 filed on Mar. 28, 2016, Korean Patent Application No. 10-2016-0037141 filed on Mar. 28, 2016, and Korean Patent Application No. 10-2016-0104466 filed on Aug. 17, 2016, the entire contents of which are herein incorporated by reference.

FIELD OF THE INVENTION

The present invention relates to a waveguide for transmission of electromagnetic wave signals.

BACKGROUND

As data traffic is rapidly increased, data transmission/reception speed of I/O bus connecting integrated circuits is also being quickly increased. Over recent decades, conductor-based interconnects (e.g., copper wires) with high cost and power efficiency have been widely applied to wired communication systems. However, such conductor-based interconnects have inherent limitations in channel bandwidths due to skin effect caused by electromagnetic induction.

Meanwhile, optic-based interconnects with high data transmission/reception speed have been introduced and widely used as an alternative to the conductor-based interconnects. However, the optic-based interconnects have limitations in that they cannot completely replace the conductor-based interconnects because of the high costs of installation and maintenance thereof.

Recently, a new type of interconnect comprising a waveguide composed of a dielectric has been introduced. The new type of interconnect (so-called e-tube) has advantages of both of metal and dielectric, and enables high-speed data communication within a short range. Thus, it has come into the spotlight as an interconnect employable in chip-to-chip communication.

However, even when a conventional dielectric waveguide is used, there is a problem that a great change or variation in a group delay is caused by a non-linear phase response, or that a great signal loss is caused by the length or bending of the waveguide in an actual communication environment. In this regard, the inventor(s) present a technique for a dielectric waveguide with a novel structure to mitigate non-linearity of phase responses and reduce signal losses in an actual communication environment.

SUMMARY OF THE INVENTION

One object of the present invention is to solve all the above-described problems.

Another object of the invention is to provide a waveguide comprising a dielectric part comprising two or more dielectrics having different permittivity, and a conductor part surrounding at least a part of the dielectric part, thereby mitigating non-linearity of phase responses in chip-to-chip communication and reducing signal losses in an actual communication environment.

According to one aspect of the invention to achieve the objects as described above, there is provided a waveguide for transmission of electromagnetic wave signals, comprising: a dielectric part comprising two or more dielectrics having different permittivity; and a conductor part surrounding at least a part of the dielectric part.

In addition, there are further provided other waveguides to implement the invention.

According to the invention, non-linearity of phase responses can be mitigated in chip-to-chip communication using a waveguide, thereby reducing the degree of change in a group delay that may occur according to a frequency change.

According to the invention, a waveguide comprises a dielectric part composed of two or more dielectrics having different permittivity, thereby lowering a carrier frequency of a signal transmitted through the waveguide and efficiently using a bandwidth of a signal transmission channel.

According to the invention, losses in a signal transmission channel can be reduced in an actual communication environment where a waveguide is lengthened or bent.

DETAILED DESCRIPTION OF THE INVENTION

Figure 1:
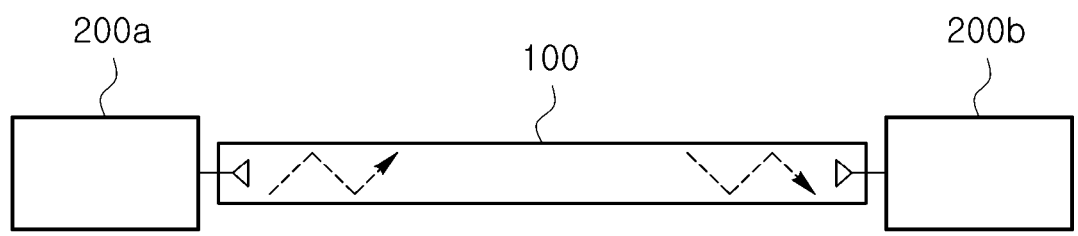
FIG. 1 conceptually shows the configuration of a chip-to-chip interface apparatus interconnected with a two-port network according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a chip-to-chip interface apparatus FIG. 1 conceptually shows the configuration of a chip-to-chip interface apparatus interconnected with a two-port network according to one embodiment of the invention.

Referring to FIG. 1, a chip-to-chip interface apparatus according to one embodiment of the invention may comprise: a waveguide 100, which is an interconnect means for transmission of electromagnetic wave signals (e.g., data communication) between two chips (not shown) each present in two physically separated boards (not shown) or present in a single board (not shown); and microstrip circuits 200*a*, 200*b*, which are means for delivering the signals from the two chips to the waveguide 100 or vice versa. It should be understood that the chips described herein do not only represent electronic circuit components in a traditional sense, each comprising a number of semiconductors such as transistors or the like, but also encompass, in their broadest sense, all types of components or elements that can exchange electromagnetic wave signals with each other.

According to one embodiment of the invention, a signal generated from the first chip may be propagated along a feeding line and a probe of the first microstrip circuit 200*a*, and may be transmitted to the second chip through the waveguide 100 as it is transited at an impedance discontinuity surface between the first microstrip circuit 200*a* and the waveguide 100.

Further, according to one embodiment of the invention, a signal transmitted through the waveguide 100 may be transmitted to the second chip through the second microstrip circuit 200*b* as it is transited at an impedance discontinuity surface between the waveguide 100 and the second microstrip circuit 200*b*.

Configuration of the waveguide Hereinafter, the internal configuration of the waveguide 100 crucial for implementing the present invention and the functions of the respective components thereof will be discussed.

Figure 2:
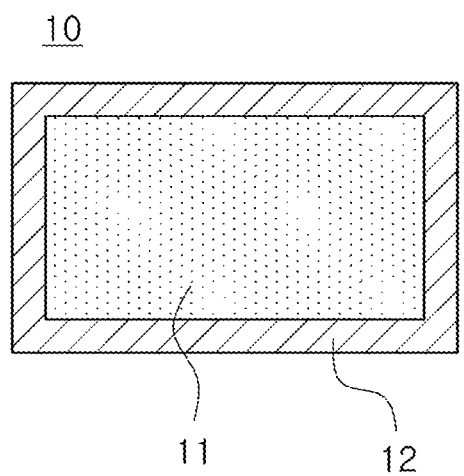
FIG. 2 illustratively shows the configuration of a waveguide according to prior art.

FIG. 2 illustratively shows the configuration of a waveguide 10 according to prior art.

Referring to FIG. 2, the waveguide 10 according to prior art may comprise a dielectric core 11 and a metal cladding 12 surrounding the dielectric core 11.

When signals are transmitted using the waveguide according to prior art, there may arise problems that a great change or variation in a group delay is caused by a non-linear phase response, and that a great signal loss is caused by the length or bending of the waveguide in an actual communication environment.

Figure 3:
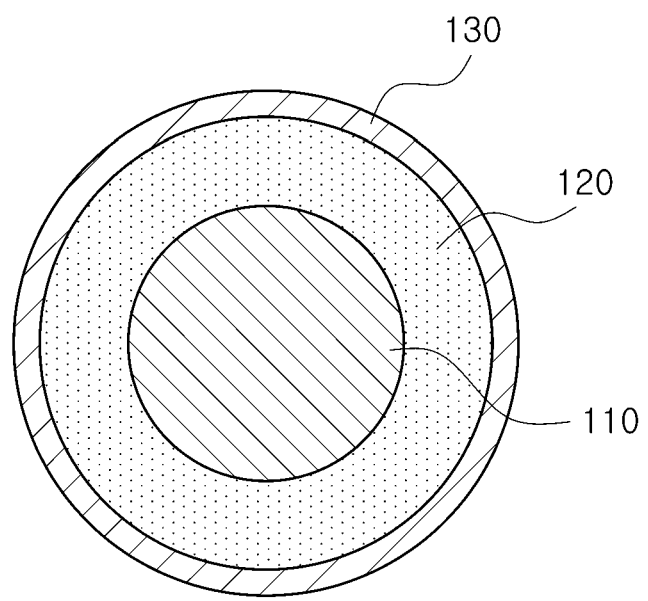
FIG. 3 illustratively shows the configuration of a waveguide according to one embodiment of the invention.

FIG. 3 illustratively shows the configuration of a waveguide according to one embodiment of the invention.

Referring to FIG. 3, the waveguide 100 according to one embodiment of the invention may comprise a dielectric part comprising two or more dielectrics having different permittivity, and a conductor part 130 surrounding at least a part of the dielectric part.

Specifically, according to one embodiment of the invention, the two or more dielectrics included in the dielectric part may comprise a first dielectric 110 and a second dielectric 120, and the second dielectric 120 may be formed to surround at least a part of the first dielectric 110. For example, the second dielectric 120 may surround all or a part of the first dielectric 110.

More specifically, according to one embodiment of the invention, the first dielectric 110 may be in the form or a circular core, and the second dielectric 120 and the conductor part 130 may be in the form of an annular cladding, as seen from a cross-section cut along a direction perpendicular to the length of the waveguide 100, as shown in FIG. 3. Further, according to one embodiment of the invention, the central axis of the dielectric part (more specifically, those of the first dielectric 110 and the second dielectric 120) may coincide with that of the conductor part 130.

However, it is noted that the internal configuration or shape of the waveguide 100 according to the invention is not necessarily limited to those mentioned above, and may be changed without limitation as long as the objects of the invention can be achieved.

Meanwhile, according to one embodiment of the invention, the conductor part 130 may consist of a material having electrical conductivity. For example, the conductor part 130 according to one embodiment of the invention may consist of a metallic material such as copper (Cu) which is traditionally in wide use, or may consist of a non-metallic material such as graphene.

Figure 9A:
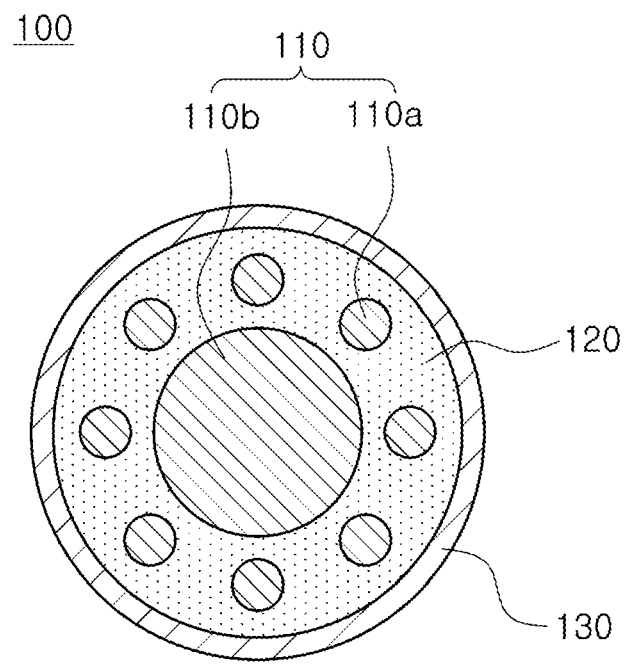
FIG. 9A illustratively shows the configuration of a waveguide according to another embodiment of the invention.
Figure 9B:
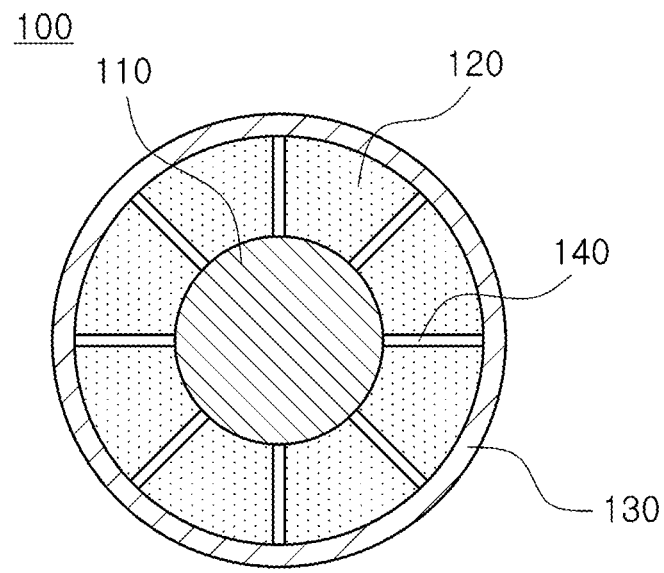
FIG. 9B illustratively shows the configuration of a waveguide according to another embodiment of the invention.

FIGS. 9A and 9B illustratively show the configuration of a waveguide 100 according to another embodiment of the invention.

Referring to FIG. 9A, the first dielectric 110 included in the waveguide 100 according to another embodiment of the invention may consist of two or more partial dielectrics 110*a*, 110*b* separated from each other, and the second dielectric 120 may be formed to surround at least a part of the above two or more partial dielectrics. In the embodiment of FIG. 9A, the first dielectric 110 may consist of air.

Referring to FIG. 9B, the waveguide 100 according to another embodiment of the invention may further comprise a support 140, which is disposed between the first dielectric 110 and the conductor part 130 and functions to maintain a space in which the second dielectric 120 is located between the first dielectric 110 and the conductor part 130. In the embodiment of FIG. 9B, the second dielectric 120 may consist of air.

Meanwhile, according to one embodiment of the invention, the permittivity of the first dielectric 110 may be greater or less than that of the second dielectric 120. More specifically, according to one embodiment of the invention, the first dielectric 110 and the second dielectric 120 having different permittivity may be used to drastically reduce the degree of change in a group delay occurring according to a frequency change in a signal transmission channel via the waveguide 100. In particular, in the embodiment of FIG. 3, the greater the permittivity of the first dielectric 110 is than that of the second dielectric 120, the smaller the degree of change in the group delay can be. The group delay will be discussed in detail below.

For example, the first dielectric 110 may consist of Teflon™ having a dielectric constant of about 2.0, and the second dielectric 120 may consist of polyethylene having a dielectric constant of about 1.2. Further, as another example, the first dielectric 110 may consist of air having a dielectric constant of about 1.0, and the second dielectric 120 may consist of Teflon™ having a dielectric constant of about 2.0. Conversely, the first dielectric 110 may consist of Teflon™ and the second dielectric 120 may consist of air.

Therefore, according to one embodiment of the invention, a signal transmitted through the waveguide 100 (i.e., an electromagnetic wave) may be guided along a boundary between the first dielectric 110 and the second dielectric 120 having different permittivity, or along a boundary between the first dielectric 110 or the second dielectric 120 and the conductor part 130.

Although not shown in the drawings, according to one embodiment of the invention, two or more waveguides 100 (i.e., the two or more waveguides 100 each comprising the first dielectric 110, the second dielectric 120, and the conductor part 130) may be coupled in a predetermined arrangement to form a bundle, and the two or more waveguides 100 included in the bundle may function to transmit signals through different signal transmission channels, respectively.

Figure 4A:
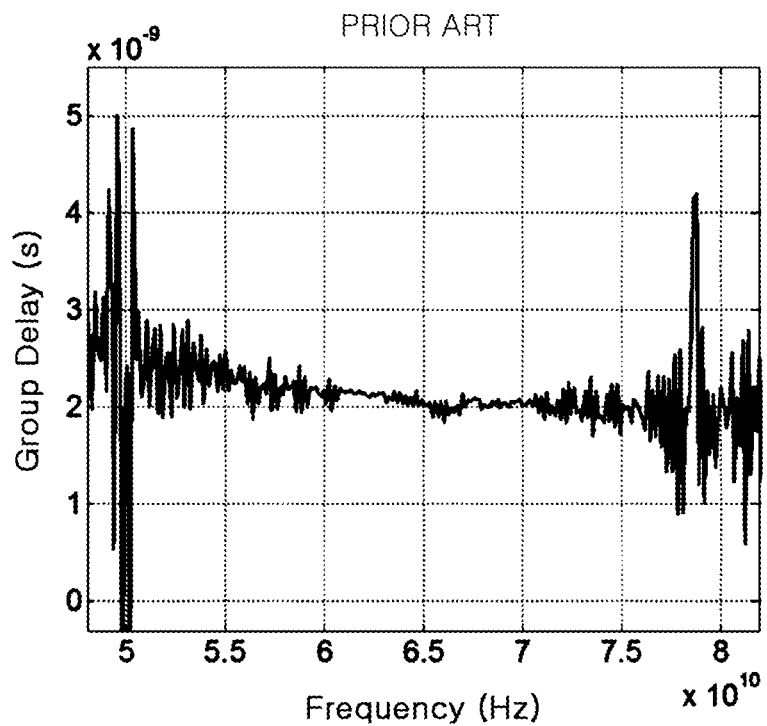
FIG. 4A shows results of tests in which a group delay is measured for each of the cases where signals are transmitted/received using waveguides according to prior art.
Figure 4B:
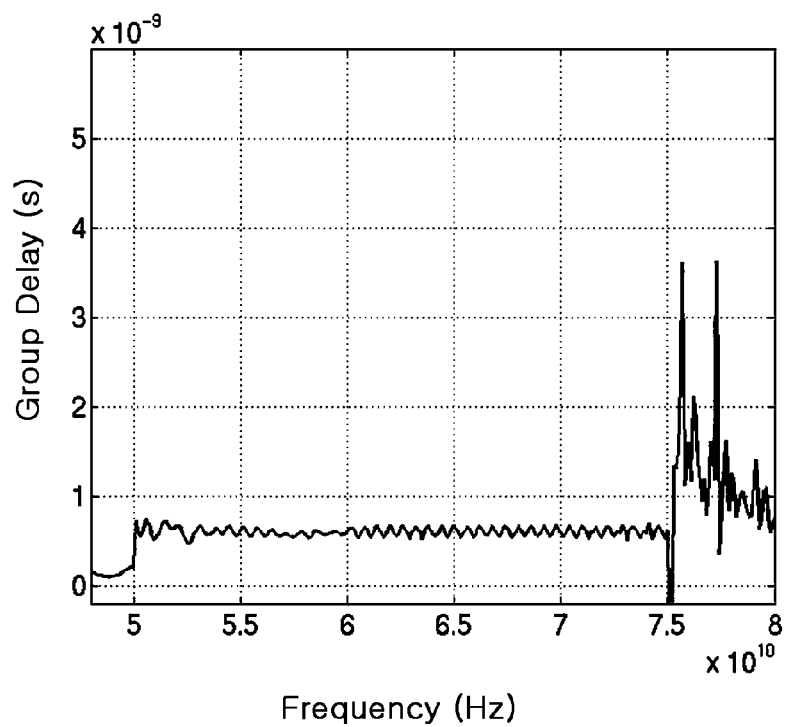
FIG. 4B shows results of tests in which a group delay is measured for each of the cases where signals are transmitted/received using waveguides according to one embodiment of the invention.

FIGS. 4A and 4B show results of tests in which a group delay is measured for each of the cases where signals are transmitted/received using waveguides according to prior art and according to one embodiment of the invention.

First, referring to FIG. 4A, when the waveguide according to prior art (i.e. the waveguide composed of the dielectric core 11 and the metal cladding 12) is employed, non-linear phase responses may be heavily generated, which increases the degree of change in a group delay according to a frequency change in a signal transmission channel via the waveguide. Actually, referring to the graph of FIG. 4A (where the group delay is shown in seconds (s) and the frequency is shown in Hz), the group delay at the frequency of 50 GHz is close to infinity, while the group delay at the frequency of 73 GHz is about 20 ns. From the above, it can be seen that the variation (or change) in the group delay of a transmission signal, which occurs as the frequency band is changed, is very large.

Referring to FIG. 4B, when the waveguide according to one embodiment of the invention (i.e., the waveguide composed of the first dielectric 110, the second dielectric 120, and the conductor part 130) is employed, non-linear phase responses may be reduced, thereby dramatically reducing the degree of change in a group delay according to a frequency change, which may occur in a signal transmission channel via the waveguide. Actually, referring to the graph of FIG. 4B (where the group delay is shown in seconds (s) and the frequency is shown in Hz), it turns out that the group delay is constantly maintained at 7 ns to 8 ns throughout the frequency band from 50 GHz to 73 GHz. From the test results, it can be seen that when the waveguide 100 according to one embodiment of the invention is employed, the variation (or change) in the group delay of a transmission signal, which occurs as the frequency band is changed, can be drastically reduced.

Figure 5A:
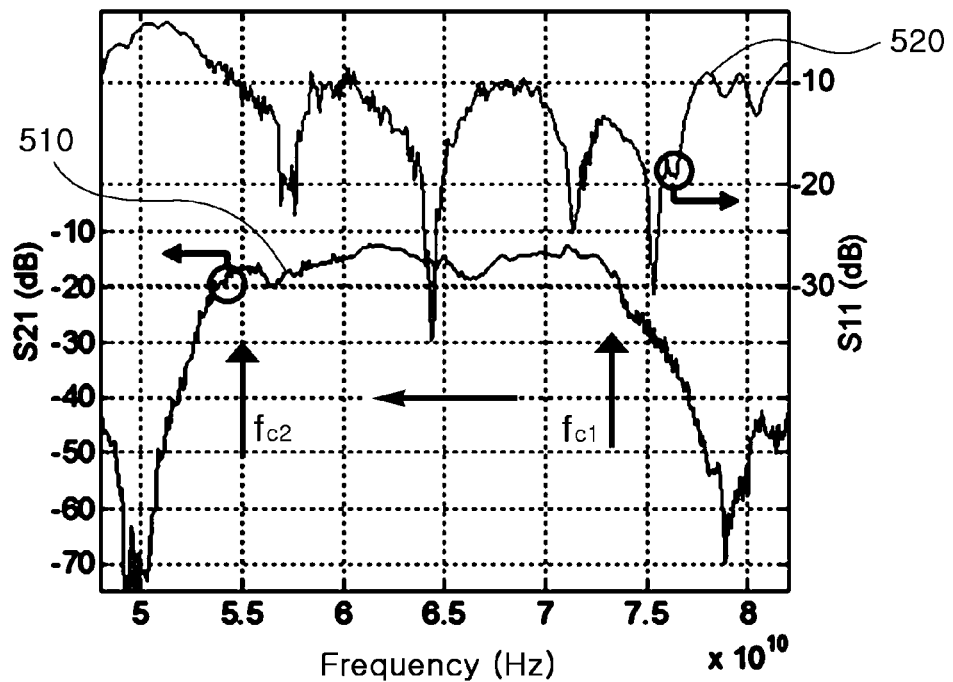
FIG. 5A illustratively shows bandwidths available for the case where signals are transmitted/received using a waveguide according to one embodiment of the invention.
Figure 5B:
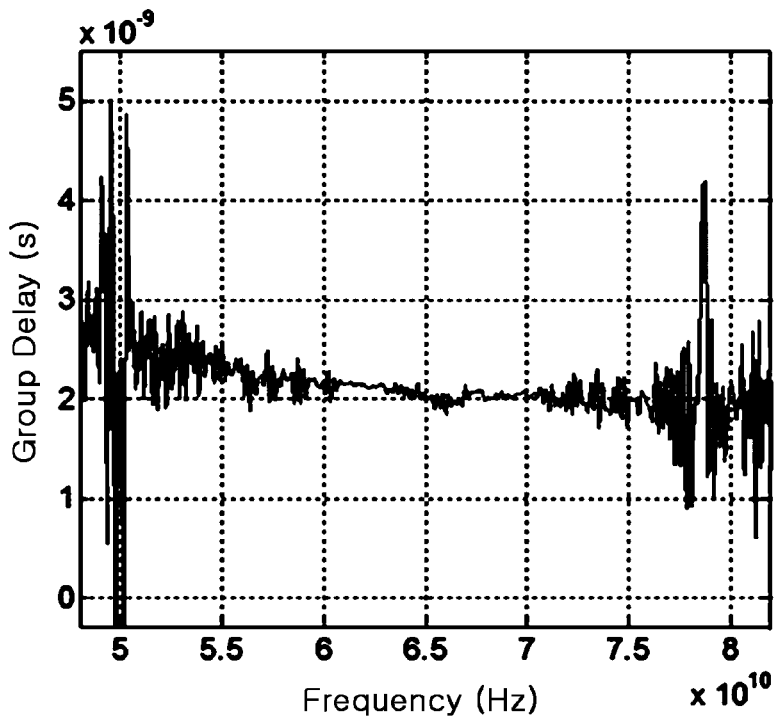
FIG. 5B illustratively shows bandwidths available for the case where signals are transmitted/received using a waveguide according to one embodiment of the invention.

FIGS. 5A and 5B illustratively show bandwidths available for the case where signals are transmitted/received using a waveguide according to one embodiment of the invention.

Referring to FIGS. 5A and 5B, the waveguide 100 according to one embodiment of the invention may comprise the first dielectric 110 and the second dielectric 120 having different permittivity, thereby drastically reducing the change in a group delay that may occur according to a frequency change in a signal transmission channel via the waveguide 100 (see FIG. 5A where a transmission coefficient S21 and a reflection coefficient S11 of S-parameters of the signal transmission channel are respectively shown as 510 and 520 in dB and the frequency is shown in Hz, and FIG. 5B where the group delay is shown in seconds (s) and the frequency is shown in Hz), so that a user (or designer) may lower a carrier frequency of a signal transmitted through the waveguide 100 from an upper corner frequency ($f_{c1}$ in FIG. 5A) to a lower corner frequency ($f_{c2}$ in FIG. 5A).

Therefore, by means of the waveguide 100 according to one embodiment of the invention, single side band transmission is enabled so that the bandwidth of the signal transmission channel may be efficiently used, and the carrier frequency may be lowered so that the chip-to-chip interface (and further, the signal transceiver) including the waveguide 100 may be reliably operated and the low-power design of the chip-to-chip interface is enabled.

On the contrary, when the waveguide according to prior art without the second dielectric 120 is employed (see FIGS. and 4A), considerably non-linear phase responses are generated in the vicinity of the lower corner frequency, and thus it is unavoidable that the transmission signal is heavily distorted if the carrier frequency is lowered to the lower corner frequency.

Figure 6A:
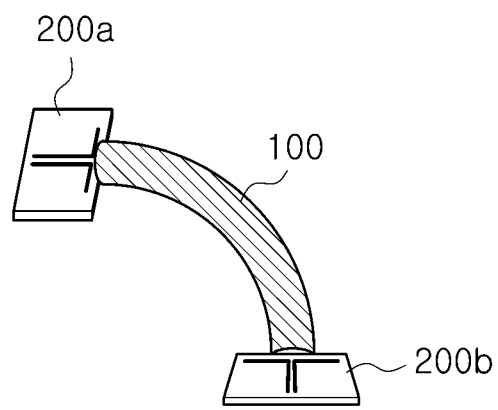
FIG. 6A shows the waveguide comprising all of the first dielectric, the second dielectric, and the conductor part according to one embodiment of the invention.
Figure 6B:
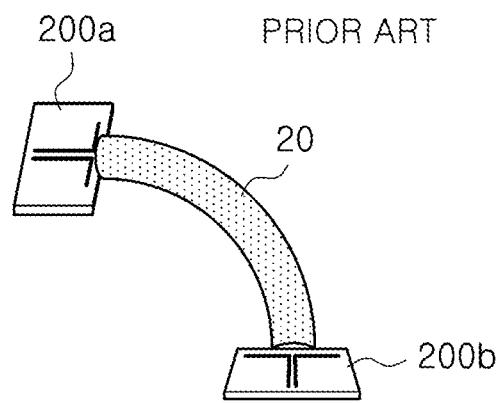
FIG. 6B shows the waveguide comprising only the first dielectric and the second dielectric (i.e., without the conductor part) according to prior art.
Figure 6C:
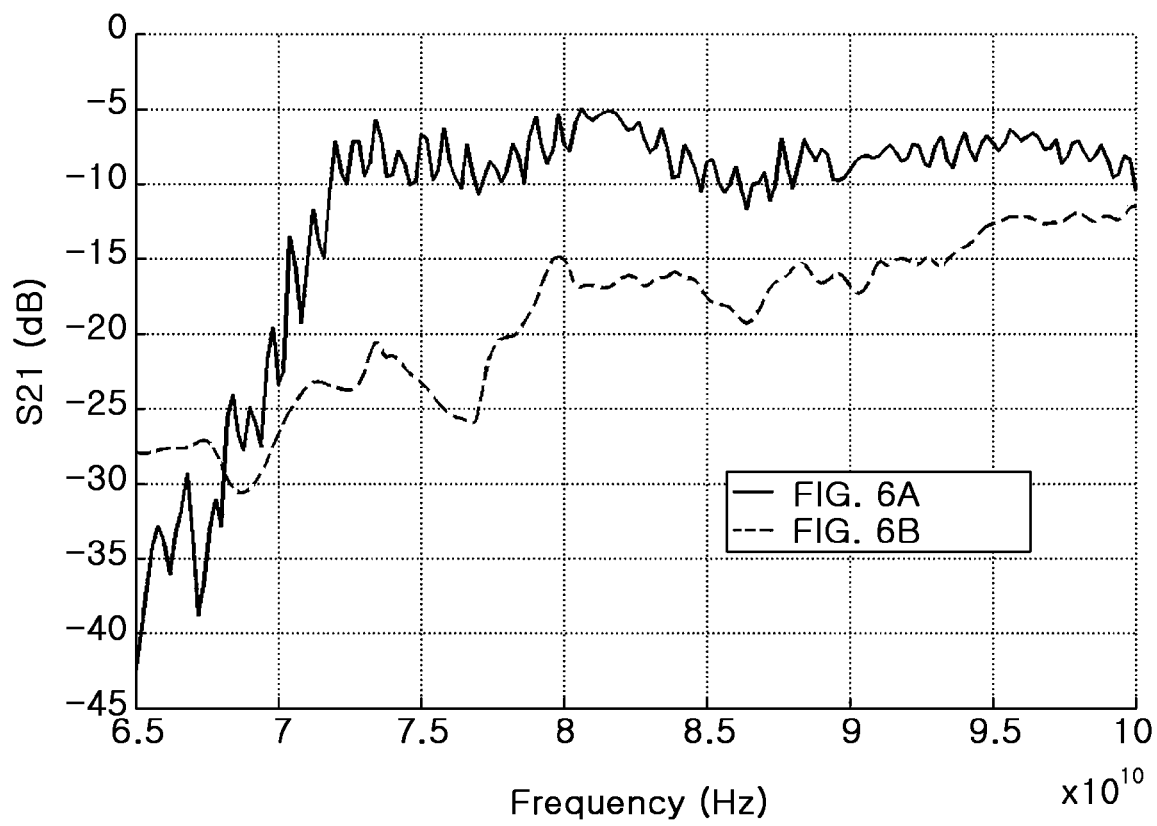
FIG. 6C shows results of tests in which a signal loss is measured for each of the cases where signals are transmitted/received using waveguides according to prior art and according to one embodiment of the invention.

FIGS. 6A to 6C show results of tests in which a signal loss is measured for each of the cases where signals are transmitted/received using waveguides according to prior art and according to one embodiment of the invention. In the embodiments of FIGS. 6A to 6C, the waveguides according to one embodiment of the invention and according to prior art are both 15 cm in length, and the two waveguides transmit signals as they are bent in the same degree.

FIG. 6C shows the signal transmission channel characteristics of the waveguide comprising all of the first dielectric, the second dielectric, and the conductor part according to one embodiment of the invention (see FIG. 6A), and those of the waveguide comprising only the first dielectric and the second dielectric (i.e., without the conductor part) according to prior art (see FIG. 6B).

Specifically, referring to FIG. 6C (where the signal loss is shown as "S21 (dB)" and the frequency is shown as "Frequency (Hz)"), the waveguide according to one embodiment of the invention is more capable of confining a signal within the waveguide than the waveguide according to prior art, and thus it can be seen that the signal loss is less (i.e., the signal intensity is greater) over a wide frequency band (e.g., from 70 GHz to 100 GHz) compared to the waveguide according to prior art.

More specifically, in the waveguide comprising only the first and second dielectrics without the conductor part according to prior art, a signal may be guided by total reflection made at a boundary between the first and second dielectrics. If the waveguide is severely bent to such an extent that the total reflection does not occur, the signal may not be properly guided in the waveguide and may escape from the waveguide, resulting in a signal loss. On the contrary, in the waveguide comprising all of the first dielectric, the second dielectric, and the conductor part according to the invention, even if the waveguide is severely bent to such an extent that total reflection is not made at the boundary between the first and second dielectrics, a signal that is not totally reflected at the boundary between the first and second dielectrics and escapes outward may be guided along a boundary between the second dielectric and the conductor part, thereby preventing the signal from leaking out of the waveguide and reducing the signal loss. Further, since the wavelength of the signal is longer as the frequency thereof is lower, the difference in performance between the waveguides according to prior art and according to the invention (i.e., capability to prevent a signal loss due to bending of the waveguide) may be more notable as the frequency of the transmitted signal is lower.

Therefore, according to the waveguide according to one embodiment of the invention, it is possible to reduce losses in a signal transmission channel in an actual communication environment where the waveguide is lengthened or bent.

Figure 7:
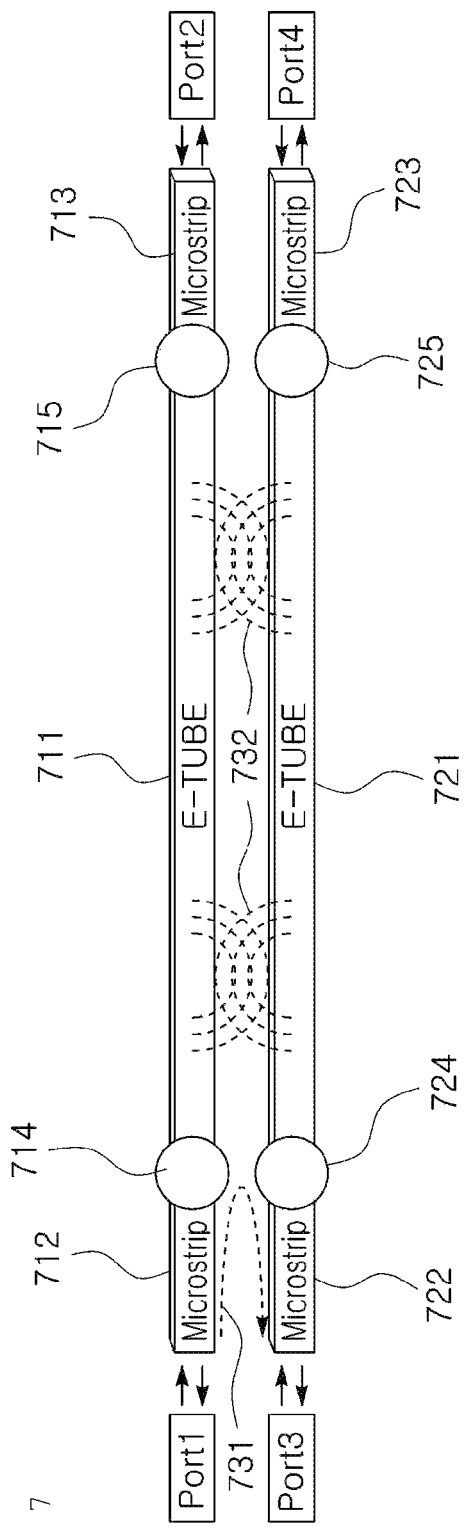
FIG. 7 illustratively shows a result of simulating interference between signal transmission channels according to one embodiment of the invention.
Figure 8:
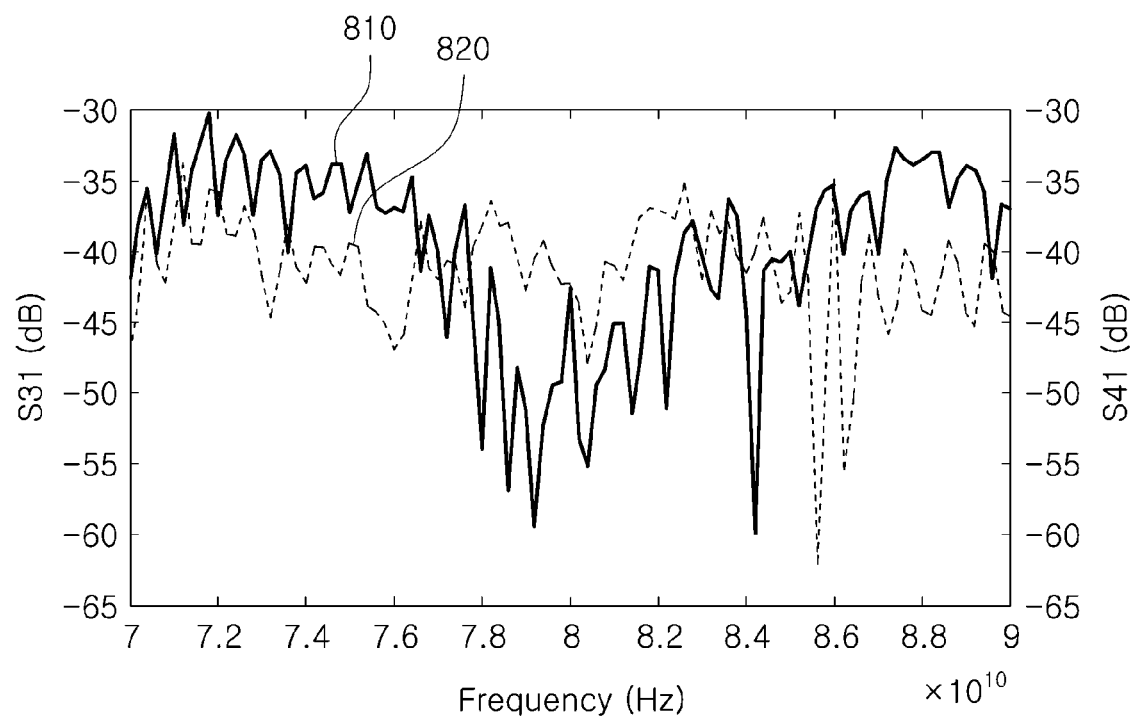
FIG. 8 illustratively shows a result of simulating interference between signal transmission channels according to one embodiment of the invention.

FIGS. 7 and 8 illustratively show a result of simulating interference between signal transmission channels according to one embodiment of the invention.

In the embodiment of FIG. 7, it may be assumed that an electromagnetic wave signal is transmitted through each of two waveguides 711, 721, which are implemented as e-tubes and disposed close to each other with an interval of 0.5 mm.

In this case, referring to FIG. 7, a signal transmission coefficient S31 between a transition 714 between a microstrip circuit 712 for port 1 and a first waveguide 711, and a transition 724 between a microstrip circuit 722 for port 3 and a second waveguide 721 is as small as −30 dB or less (see 810 in FIG. 8 where S31 is shown in dB and the frequency is shown in Hz), and thus it can be seen that the interference between the transition 714 between the microstrip circuit 712 and the first waveguide 711, and a transition 715 between a microstrip circuit 713 for port 2 and the first waveguide 711 (i.e., 731 in FIG. 7) is negligibly small.

Referring further to FIG. 7, a signal transmission coefficient S41 between the transition 714 between the microstrip circuit 712 and the first waveguide 711, and a transition 725 between a microstrip circuit 723 for port 4 and the second waveguide 721 is also as small as −30 dB or less (see 820 in FIG. 8 where S41 is shown in dB and the frequency is shown in Hz), and thus it can be seen that the interference between the two waveguides 711, 721 (i.e., 732 in FIG. 7) is also negligibly small.

Therefore, according to one embodiment of the invention, the conductor parts included in the two adjacent waveguides 711, 721 may bring about a remarkable effect of preventing the signal interference between the two adjacent waveguides 711, 721, as can be seen from the embodiments of FIGS. 7 and 8.

Although it has been mainly described above that the dielectric part included in the waveguide according to the invention is composed of two dielectrics having different permittivity (i.e., the first dielectric 110 and the second dielectric 120), it is noted that the configuration of the dielectric part of the waveguide according to the invention is not necessarily limited to the above description, and may be changed without limitation as long as the objects or effects of the invention can be achieved. For example, the dielectric part of the waveguide according to another embodiment of the invention may comprise three or more dielectrics having different permittivity.

Although details or parameters for the components included in the waveguide according to the invention have been described above in detail, it is noted that the configuration of the microstrip circuit according to the invention is not necessarily limited to those mentioned above, and may be changed without limitation as long as the objects or effects of the invention can be achieved.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A waveguide for transmission of electromagnetic wave signals, comprising:
    a dielectric part comprising two or more dielectrics having different permittivity; and
    a conductor part surrounding at least a part of the dielectric part,
    wherein the two or more dielectrics comprise a first dielectric and a second dielectric, and the second dielectric surrounds at least a part of the first dielectric, and
    wherein the first dielectric consists of two or more partial dielectrics separated from each other, and the second dielectric surrounds at least a part of the two or more partial dielectrics.

2. The waveguide of claim 1, wherein a change in a group delay, which occurs according to a frequency change in a signal transmission channel of a signal transmitted through the waveguide, does not exceed a predetermined level.

3. The waveguide of claim 1, wherein central axes of the first dielectric, the second dielectric, and the conductor part coincide with each other.

4. The waveguide of claim 1, further comprising:
    a support disposed between the first dielectric and the conductor part to maintain a space in which the second dielectric is located between the first dielectric and the conductor part.

5. The waveguide of claim 1, wherein a signal transmitted through the waveguide is guided along a boundary between the first dielectric and the second dielectric, along a boundary between the first dielectric and the conductor part, or along a boundary between the second dielectric and the conductor part.

6. The waveguide of claim 1, wherein one of the first dielectric and the second dielectric consists of air.

* * * * *